(12) United States Patent
Kitamura et al.

(10) Patent No.: US 11,400,606 B2
(45) Date of Patent: Aug. 2, 2022

(54) ARTICULATED ROBOT AND METHOD OF ESTIMATING DECREASE STATE OF GAS IN GAS SPRING

(71) Applicant: KAWASAKI JUKOGYO KABUSHIKI KAISHA, Kobe (JP)

(72) Inventors: Shinji Kitamura, Kakogawa (JP); Motoki Himeno, Toyota (JP); Yusuke Fujii, Kakogawa (JP); Shunsuke Wakimitsu, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 970 days.

(21) Appl. No.: 16/083,621

(22) PCT Filed: Mar. 9, 2017

(86) PCT No.: PCT/JP2017/009618
§ 371 (c)(1),
(2) Date: Sep. 10, 2018

(87) PCT Pub. No.: WO2017/155071
PCT Pub. Date: Sep. 14, 2017

(65) Prior Publication Data
US 2020/0164529 A1  May 28, 2020

(30) Foreign Application Priority Data

Mar. 9, 2016 (JP) .............................. JP2016-046135

(51) Int. Cl.
*B25J 19/00* (2006.01)
*B25J 9/16* (2006.01)

(52) U.S. Cl.
CPC ........... *B25J 19/0095* (2013.01); *B25J 9/163* (2013.01); *B25J 19/0012* (2013.01)

(58) Field of Classification Search
CPC ...... B25J 9/1674; B25J 9/144; B25J 19/0012; B25J 19/0095; B25J 9/163
See application file for complete search history.

(56) References Cited

U.S. PATENT DOCUMENTS

| 6,408,225 B1 * | 6/2002 | Ortmeier | B25J 19/0012 |
| | | | 192/58.62 |
| 2008/0210477 A1 * | 9/2008 | Takenaka | B62D 57/032 |
| | | | 180/8.6 |

(Continued)

FOREIGN PATENT DOCUMENTS

| JP | H09-220990 A | † | 9/1997 |
| JP | H10-138189 A | | 5/1998 |

(Continued)

OTHER PUBLICATIONS

Kim et al., Application of gas spring for robot arm balancing, 2014, IEEE, p. 338-341 (Year: 2014).*

(Continued)

*Primary Examiner* — Marc McDieunel
(74) *Attorney, Agent, or Firm* — Oliff PLC (57) ABSTRACT

An articulated robot has an arm, a drive motor for driving and positioning the arm, a gas spring for supporting a load acting on the arm to reduce a load of the drive motor and a control unit for controlling the drive motor. The control unit has a function of estimating a decrease state of a gas sealed inside the gas spring based on an actual current value of the drive motor obtained at a stop position at which the drive motor is operated and stopped in an energized state. The decrease state of the gas sealed inside the gas spring is estimated based on the current value of a servo motor without causing decline in operation rate of the robot.

10 Claims, 4 Drawing Sheets

(56) References Cited

U.S. PATENT DOCUMENTS

| | | | |
|---|---|---|---|
| 2010/0212305 A1* | 8/2010 | Runesson | B25J 19/0012 |
| | | | 60/327 |
| 2014/0297032 A1* | 10/2014 | Hayashi | B25J 9/1674 |
| | | | 700/245 |
| 2014/0297037 A1† | 10/2014 | Hayashi | |
| 2019/0160676 A1* | 5/2019 | Harada | B25J 9/1666 |
| 2021/0069919 A1* | 3/2021 | Fujii | B25J 13/088 |
| 2021/0107171 A1* | 4/2021 | Harada | B25J 9/10 |
| 2021/0197380 A1* | 7/2021 | Onodera | B25J 9/1674 |

FOREIGN PATENT DOCUMENTS

| | | | |
|---|---|---|---|
| JP | H11-048185 A | | 2/1999 |
| JP | 2005-001013 A | † | 1/2005 |
| JP | 2014-193516 A | | 10/2014 |
| JP | 2014-195849 A | | 10/2014 |

OTHER PUBLICATIONS

Choi et al., Linkage-driven manipulator with embedded ultrasonic motors, 2012, IEEE, p. (Year: 2012).*

Bassi et al., Control of a mechanical simulator for testing electrical drives for robotics and industrial automation, 1994, IEEE, p. 1787-1792 (Year: 1994).*

Chen et al., Design Method of Modular Units for Articulated in-Pipe Robot Inspecting System, 2011, IEEE, p. (Year: 2011).*

\* cited by examiner
† cited by third party

ARTICULATED ROBOT AND METHOD OF ESTIMATING DECREASE STATE OF GAS IN GAS SPRING

TECHNICAL FIELD

The present invention relates to an articulated robot provided with an arm driven by a drive motor and a method for estimating a gas decrease state of its gas spring.

BACKGROUND ART

Conventionally, a gas spring utilizing a reaction force against a piston due to an increase in the pressure of a gas compressed according to the movement of the piston as a spring is used in various machines and equipment, in which the compressibility of the gas sealed in a cylinder having a piston sliding in the axial direction is utilized.

As a representative example of using a gas spring, it is adopted as a gas balancer for an arm on which a load due to gravity acts in an articulated robot (for example, Patent Document 1). In the gas balancer, the gas spring is attached to the arm of the robot, so that a balancing force is exerted by the gas spring in a direction opposite to the load acting on the arm. As a result, it is possible to reduce the motor load at the time of elevating and lowering the arm and holding the position of the arm and realize miniaturization of the robot and increase of the weight of payload.

However, since in the gas spring the high pressure gas is enclosed inside the cylinder in which the piston slides in the axial direction, there is a problem that, when gas leaks due to use and the gas internal pressure decreases, and thereby the piston reaction force decreases and the gas leakage amount increases, it does not function effectively as a gas balancer.

In response to such a problem, in Patent Document 2 for example, a method is proposed in which a current value of a servo motor at a reference time is acquired as a reference current value, and a current value of the servomotor at a time point different from the reference time is acquired as a target current value while the operating condition such as the posture and the motion of the robot is set to be the same as the reference time, and the decrease amount of the gas internal pressure of the gas spring is estimated based on the difference between the reference current value and the target current value.

However, since in the method proposed in Patent Document 2, the reference current value and the target current value obtained under the same operating condition such as the posture and the speed of the robot are acquired, and the decrease amount of the internal pressure is estimated based on the difference therebetween, it is impossible to estimate the decrease amount of the gas internal pressure by acquiring the target current value obtained under an operation condition different from the operation condition of the reference time at which the reference current value was acquired.

Accordingly, in the method of Patent Document 2, it is necessary to acquire the reference current value under the operating condition preset at the reference time (reference time operating condition), and to operate the arm under the same operating condition as the reference time at the time of detecting the decrease in the gas internal pressure, that is, at the time of acquiring the target current value. Therefore, in order to acquire the target current value, it is necessary to stop the production line, for example, to perform a special operation for acquiring the target current value, and there is a problem such as decline in operation rate for a robot user.

CITATION LIST

Patent Document

[Patent Document 1] Japanese Patent Application Laid-open No. H10-138189
[Patent Document 2] Japanese Patent Application Laid-open No. 2014-195849

SUMMARY OF INVENTION

Objects to be Achieved by the Invention

The present invention is made considering the above-mentioned problems of the conventional technology, and its object is to provide an articulated robot and a gas decrease state estimation method capable of estimating the decrease state of the gas sealed inside a gas spring based on the current value of a servo motor without causing decline in operation rate of the robot and the like.

Means for Achieving the Objects

In order to achieve the above-mentioned objects, an articulated robot according to a first aspect of the present invention comprises: an arm; a drive motor for driving the arm; a gas spring for supporting a load acting on the arm to reduce a load of the drive motor; and a control unit for controlling the drive motor, wherein the control unit has a function of estimating a decrease state of a gas sealed inside the gas spring based on an actual current value of the drive motor obtained at a stop position at which the drive motor is operated and stopped in an energized state.

A second aspect of the present invention is that, in the first aspect, the control unit has a function of calculating a set current value of the drive motor in a setting state assuming that there is no decrease of a gas sealed inside the gas spring based on a rotation angle of the arm at the stop position at which the drive motor is operated and stopped in an energized state, and estimating a decrease state of a gas sealed inside the gas spring based on the set current value and the actual current value.

A third aspect of the present invention is that, in the second aspect, the set current value is calculated according to a torque-current characteristic based on a load borne by the drive motor in the setting state at the stop position at which the drive motor is operated and stopped in an energized state.

A fourth aspect of the present invention is that, in the second or third aspect, the control unit has a function of estimating a decrease state of a gas sealed inside the gas spring based on a difference between a converted current value obtained by multiplying the actual current value by a correction coefficient for comparing the actual current value with the set current value and the set current value.

A fifth aspect of the present invention is that, in any one of the first to fourth aspects, the stop position at which the drive motor is operated and stopped in an energized state includes a plurality of different positions, wherein the control unit has a function of estimating a decrease state of a gas sealed inside the gas spring based on the actual current value of the drive motor obtained at the plurality of different positions.

In order to achieve the above-mentioned objects, a sixth aspect of the present invention is a method of estimating a decrease state of a gas sealed inside the gas spring of an articulated robot comprising a drive motor for driving an arm; and a gas spring for supporting a load acting on the arm to reduce a load of the drive motor, the method comprising: a first step of operating the drive motor and stopping it in an energized state; a second step of obtaining an actual current value of the drive motor at a stop position in the first step; and a third step of estimating a decrease state of a gas sealed inside the gas spring based on the actual current value obtained in the second step.

A seventh aspect of the present invention is that, in the sixth aspect, the method calculates a set current value of the drive motor in a setting state assuming that there is no decrease of a gas sealed inside the gas spring based on a rotation angle of the arm at the stop position at which the drive motor is operated and stopped in an energized state, and estimates a decrease state of a gas sealed inside the gas spring based on the set current value and the actual current value.

An eighth aspect of the present invention is that, in the seventh aspect, the set current value is calculated according to a torque-current characteristic based on a load borne by the drive motor in the setting state at the stop position at which the drive motor is operated and stopped in an energized state.

A ninth aspect of the present invention is that, in the seventh or eighth aspect, the method estimates a decrease state of a gas sealed inside the gas spring based on a difference between a converted current value obtained by multiplying the actual current value by a correction coefficient for comparing the actual current value with the set current value and the set current value.

A tenth aspect of the present invention is that, in any one of the sixth to ninth aspects, the stop position at which the drive motor is operated and stopped in an energized state includes a plurality of different positions, the method estimating a decrease state of a gas sealed inside the gas spring based on the actual current value of the drive motor obtained at the plurality of different positions.

Advantageous Effect of the Invention

According to the present invention, there can be provided an articulated robot and a gas decrease state estimation method capable of estimating the decrease state of the gas sealed inside a gas spring based on the current value of a servo motor without causing decline in operation rate of the robot and the like.

BRIEF DESCRIPTION OF THE DRAWINGS

FIG. 4 (*a*) is a diagram illustrating the setting state of FIG. 3 (*a*) by the current value of the servo motor, and FIG. 4 (*b*) is a diagram illustrating the internal pressure declining state of FIG. 3 (*b*) by the current value of the servo motor.

EMBODIMENT OF THE INVENTION

Hereunder, an articulated robot and a method for estimating a gas decrease state of its gas spring according to one embodiment of the present invention will be described referring to the drawings.

Figure 1:
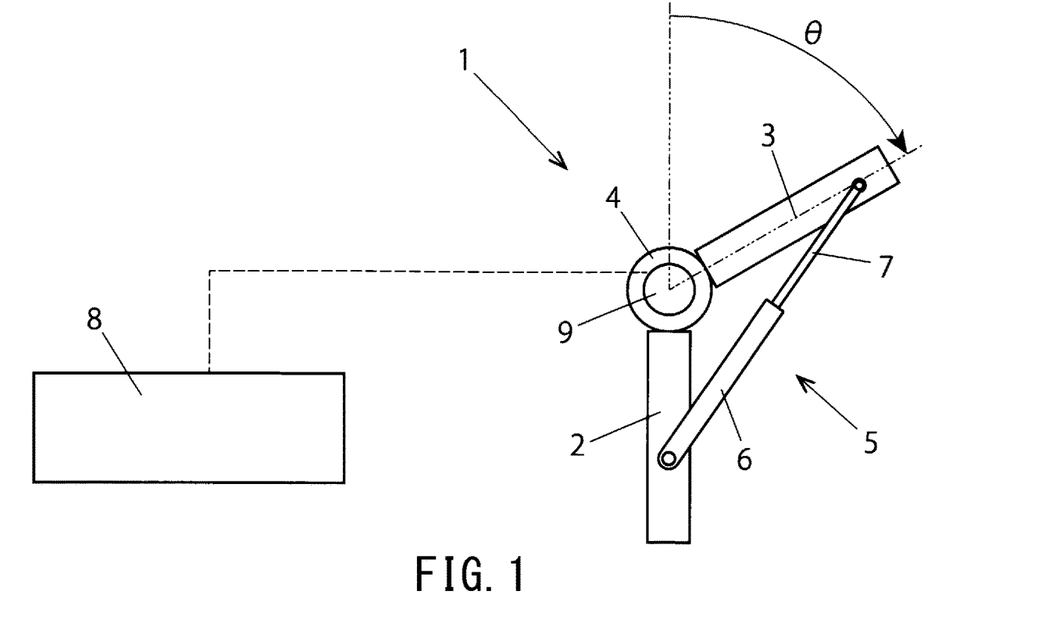
FIG. 1 is a diagram schematically illustrating a configuration of a main portion of an articulated robot according to one embodiment of the present invention.

FIG. 1 is a conceptual diagram illustrating a configuration of the main portion of this embodiment. A servo motor 9 is provided as a drive motor for driving a link 3 in a drive shaft 4 which is a connection portion between a link 2 and the link 3 configuring arms of a robot 1. By rotating the servo motor 9, the link 3 is rotated relative to the link 2 and positioned. The rotation speed and the positioning of the servo motor 9 are executed based on a command from a robot control device 8.

Additionally, in the robot 1 according to this embodiment, a gas spring 5 for supporting the load acting on the arm is connected to the link 2 and the link 3. The gas spring 5 comprises a cylinder 6 and a piston rod 7, in which the base end portion of the cylinder 6 is supported by the link 2 to be rotated, and the tip end portion of the piston rod 7 is supported by the link 3 to be rotated.

Note that, in the gas spring 5, contrary to the above, the base end portion of the cylinder 6 may be supported by the link 3 to be rotated, and the tip end portion of the piston rod 7 may be supported by the link 2 to be rotated.

Figure 2:
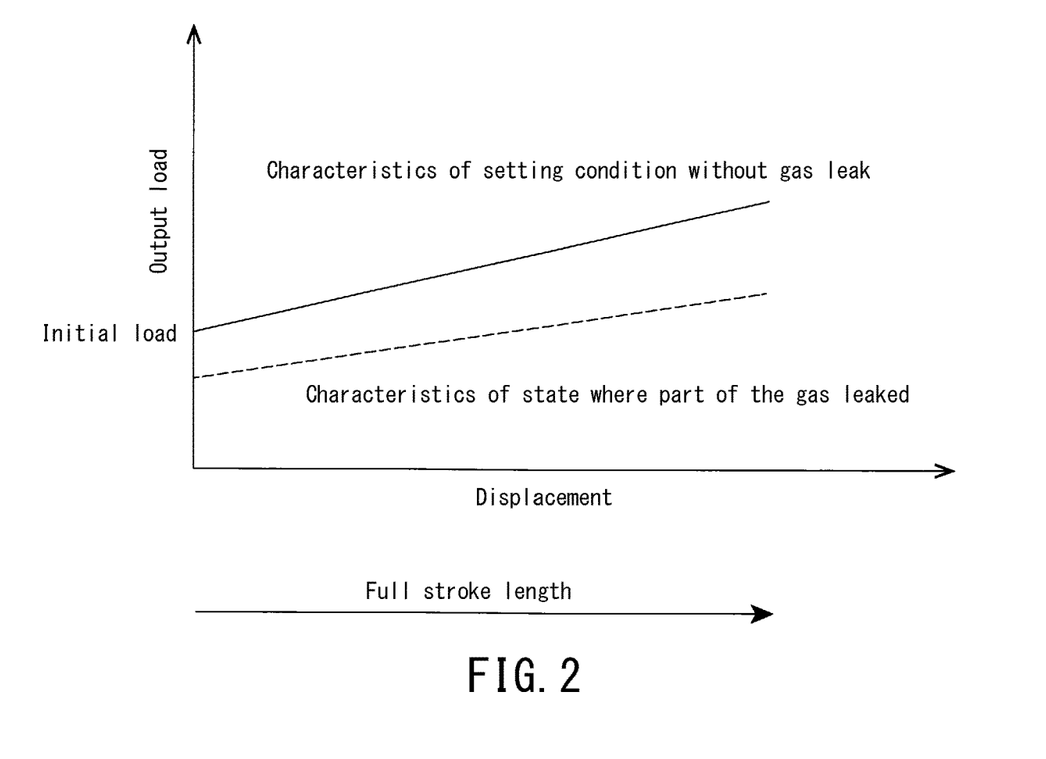
FIG. 2 is a diagram illustrating typical characteristics of a gas spring for supporting a robot arm.

A high pressure inert gas (for example, nitrogen gas) is sealed in the cylinder 6, and as illustrated by the solid line in FIG. 2, the gas spring 5 has a characteristic that it has an initial load in the use range, and when the piston rod 7 is pressed and displaced, the output load varies with a substantially constant spring constant k (inclination angle of characteristic curve) with respect to the displacement. According to such characteristics, the gas spring 5 has a balancer function for assisting the power (torque) of the servo motor 9 with respect to the gravitational load acting on the link 3 (including the link therebeyond, the same applies hereinafter).

Figure 3:
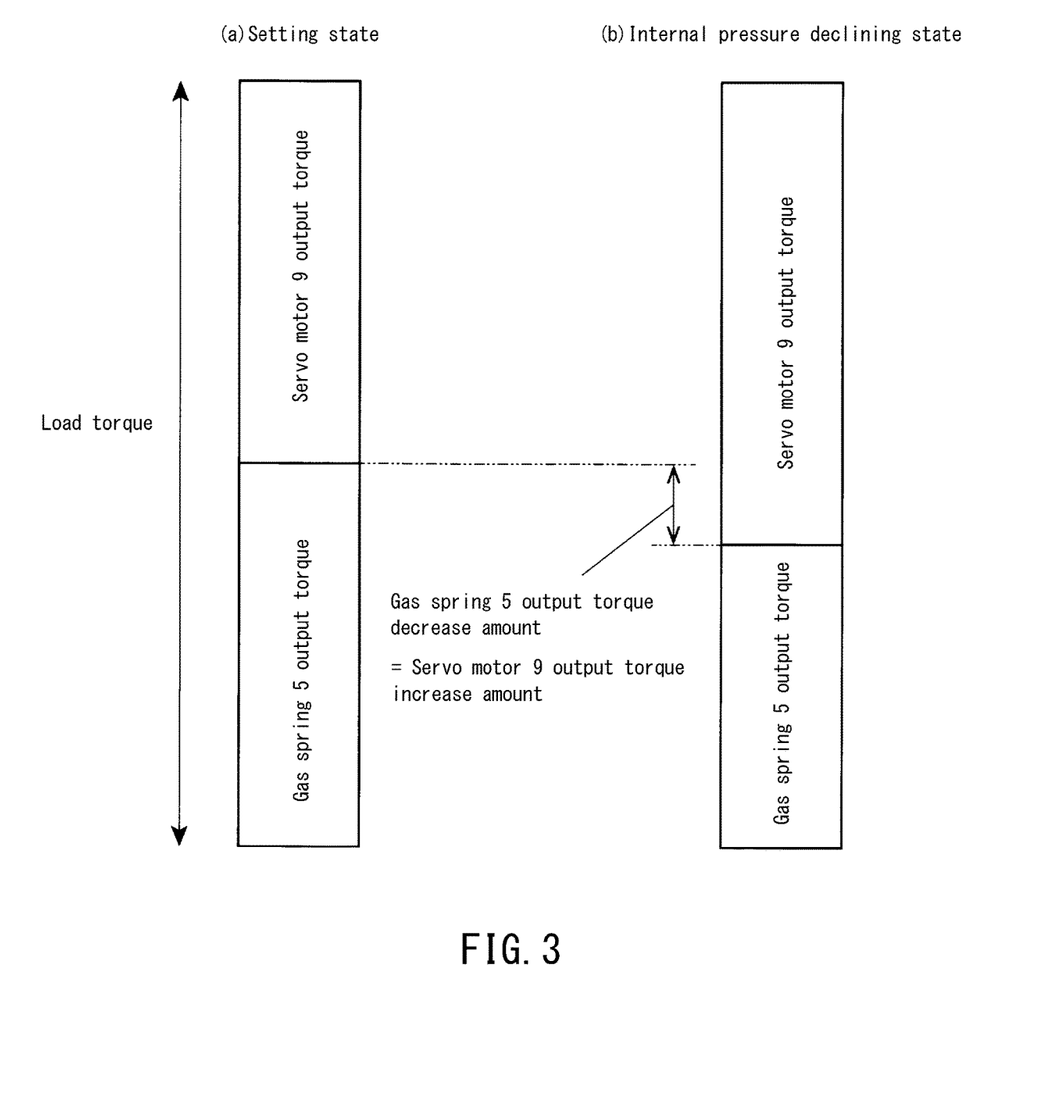
FIG. 3 is a diagram for illustrating that a load torque is achieved by a servomotor output torque and a gas spring output torque when stopping the robot arm at a stop position while energizing a servo motor, (a) indicating a setting state, and (b) indicating an internal pressure declining state.

Thus, for example, when the arm (link 2, 3) of the robot 1 is stopped at a certain position while maintaining the energized state of the servo motor 9, as illustrated in FIG. 3, the load torque including the gravitational load is borne by the output torque of the servo motor 9 and the output torque of the gas spring 5.

FIG. 3(*a*) is a diagram for illustrating the torque (motor bearing torque) borne by the servo motor 9 and the torque (spring bearing torque) borne by the gas spring 5 for generating the theoretical torque necessary for supporting the arm weight, in a set state assuming that there is no leakage of the sealed gas in the gas spring 5 when the arm of the robot 1 is stopped at a certain stop position i while energizing the servo motor 9.

FIG. 3(*b*) is a diagram for illustrating that the output borne by the servo motor 9 increases in order to generate the theoretical torque necessary for supporting the arm weight, in a state in which a part of the sealed gas in the gas spring 5 leaks and the output torque by the gas spring 5 declines.

The rotation angle of the link 3 is determined by the stop position of the arm of the robot 1, and the displacement of the piston rod 7 is unambiguously determined. Therefore, the output torque of the gas spring 5 is also determined by the stop position of the arm of the robot 1. The torque to be borne by the servo motor 9 is unambiguously determined based on the load torque determined by the stop position of the arm of the robot 1. Further, when the torque to be borne by the servo motor 9 is determined, the current value to be supplied to the servo motor 9 can be calculated computationally based on the current-torque characteristic of the servo motor 9.

When a part of the gas in the cylinder 6 leaks and the internal pressure in the cylinder 6 declines, the output load of the gas spring 5 decreases as indicated by the broken line in FIG. 2. Therefore, it is necessary to supplement the decrease amount of the output torque of the gas spring 5 due to the decrease in the output load by increasing the output torque of the servo motor 9.

Therefore, in this embodiment, there is provided a function that the decrease state of the gas sealed inside the gas spring 5 is estimated, and for example, a warning is issued, the robot 1 is stopped, or the like, when the gas internal pressure becomes smaller than a preset value. Note that, when all the gas in the cylinder 6 leaks, the spring function of the gas spring 5 completely disappears, and therefore all the torque acting on the link 2 is borne by the servo motor 9.

Hereinafter, a method of estimating the decrease amount in gas pressure when the gas in the cylinder 6 leaks and the gas pressure in the cylinder 6 declines at an arbitrary point in a time point after starting the use of the gas spring 5 of the robot 1 according to this embodiment will be described in detail.

(1) Step 1

A coefficient Ka (=Ic/Im) for converting an actual current value (Im) obtained by measuring the current of the servo motor 9 into a calculated current value Ic is obtained.

For example, with respect to a plurality of different stop positions, the robot is operated and stopped, so that the actual current value Im of the servo motor 9 is obtained, and also the calculated current value Ic is calculated to obtain Ka. Note that, the stop position is a position where the motor speed is 0 and the position deviation is constant.

In a plurality of stop positions, if the variation of Ka is small, in subsequent steps, the average value in the plurality of positions is used as the value of Ka, and if the variation is large, for example, processing is performed as follows.

When Ka depends on the posture and the like, the posture and the like are segmented into regions which are subdivided into predetermined ranges, a representative Ka is defined for each of the segmented areas so that a table or the like is created, and the corresponding Ka is used according to the stop position.

Further, when the value of Ka varies largely depending on the operation path leading to the stop position or the like, it is planned to reach the stop position by the same operation path when measuring the current of the servo motor 9.

Note that Ka is stored in a storage device of the robot control device 8 and is used in calculations, processes, and the like in the robot control device in subsequent steps.

(2) Step 2

The servo motor 9 is driven to operate the arm and the operation is stopped at a stop position i (rotation angle Θi of the drive shaft 4 of the link 3), and (A) a current value Ig_i to be supplied to the servo motor 9 in a setting state assuming that there is no gas leak in the cylinder 6 (hereinafter simply referred to as "setting state") is calculated, and also (B) a motor current value Im_i at the stop position i is measured.

(A) Calculated Value Ig_i of Current of Servo Motor in Setting State

As mentioned above, in the setting state, when the link 3 is operated and the robot is stopped while maintaining the energized state of the servo motor 9, the torque (burden torque) to be borne by the servo motor 9 and the gas spring 5 is decided unambiguously depending on the stop position i of the robot. Accordingly, based on the respective burden torques of the servo motor 9 and the gas spring 5, a current value Ig_i to be supplied to the servo motor 9 and a current value Ibal_i in the case of causing the servo motor 9 to generate the burden torque of the gas spring 5, according to the current-torque characteristic.

Figure 4:
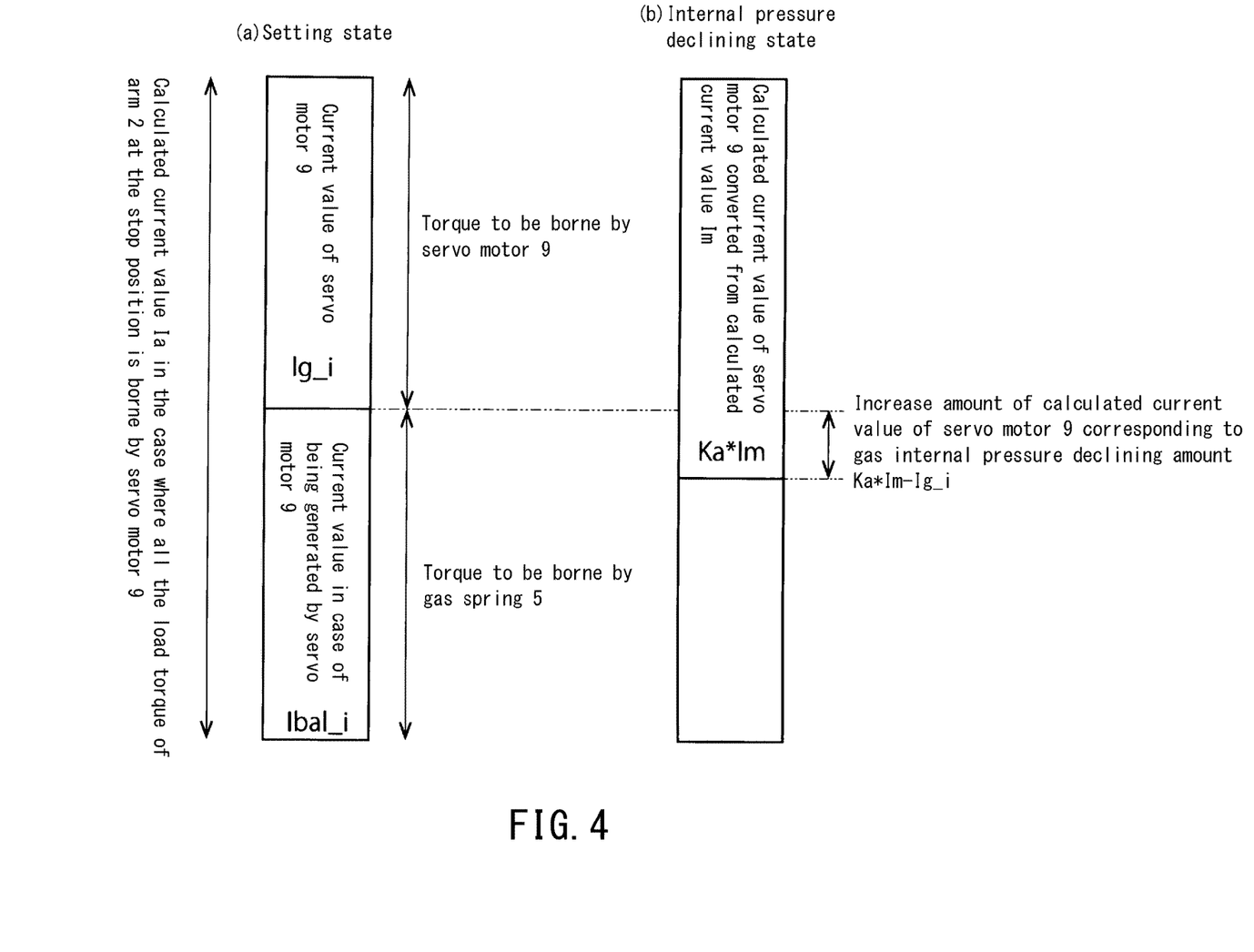

FIG. 4(*a*) is a diagram illustrating the magnitudes of the motor load current calculation values Ig_i and Ibal_i when the motor load torque and the gas spring load torque for generating the theoretical torque necessary to support the weight of the arm are to be generated by the motor current, in a setting state assuming that there is no leakage of the sealed gas in the gas spring 5 when the arm of the robot 1 is stopped at a certain stop position i while energizing the servo motor 9.

FIG. 4(*b*) is a diagram illustrating an increase amount of motor load current calculated assuming that, in a state in which a part of the sealed gas in the gas spring 5 leaks and the output by the gas spring 5 is reduced, the reduced amount of the torque generated by the gas spring 5 is compensated by the torque generated by the servo motor 9.

The above calculation and calculation processing are performed in the robot control device 8 by issuing a command of the robot movement of the link 3 and the like and based on the information such as the rotation angle of the link 3.

(B) Measured Value Im_i of Motor Current at Stop Position i

The current value flowing through the servo motor 9 is measured with an ammeter or the like.

Note that, although the robot apparently stops, the current flows through the servo motor 9 and fluctuates since the servo operation is in progress, and therefore, considering the fluctuation range, the average value of the current value of the predetermined time T (for example, T=0.1 sec) after the robot stop is adopted for the motor current value Im_i. Here, the average value of the current can be obtained, for example, by dividing the integration amount obtained by integrating the current signal by the integration circuit during the time by the time T.

The ammeter and the average value calculation processing device of the current and the like may be built in the robot control device 8 or may be arranged outside, and when arranging the ammeter and the like outside the robot control device, the device arranged outside and the robot control device 8 are connected by a signal transmission/reception cable or the like for measurement commands, measurement value transmission, and the like.

(3) Step 3

The gas pressure decrease amount ΔPi or the gas pressure P1_i of the gas spring 5 is calculated.

Since Ka*Im_i is a calculated current value of the servo motor 9 converted from the measured current value Im_i, (Ka*Im_i−Ig_i) becomes the increase amount of current which the servo motor 9 increased to compensate for the decrease in the gas pressure when the gas of the gas spring leaks and decreases below the gas pressure in the setting state.

Therefore, provided that the gas pressure in the setting state of the gas spring is P0 and the actual gas pressure is P1_i, the decrease amount ΔPi of the gas pressure at the stop position i is as follows.

$$\Delta Pi = P0 - P1\_i = P0 * (Ka * Im\_i - Ig\_i) / Ibal\_i \quad \text{(Equation 1)}$$

Note that, since there is no increase in current for compensating for the decrease in gas pressure due to leakage of gas if there is no leakage of gas of the gas spring, $Ka*Im\_i-Ig\_i=0$, and therefore, $\Delta Pi=0$ is found in expression 1.

Further, the actual gas pressure $P1\_i$ can be obtained from the following equation obtained by modifying Equation 1.

$$P1\_i = P0*(1-(Ka*Im\_i-Ig\_i)/Ibal\_i) \quad \text{(Equation 2)}$$

The above arithmetic processing and the like are performed in the robot control device 8.

(4) Step 4

When the decrease amount $\Delta Pi$ of the gas pressure from the setting state of the gas spring is larger than a predetermined decrease amount or when the actual gas pressure $P1\_i$ falls below the preset pressure, display and warning are performed as there is a possibility that gas leakage amount of the gas spring is large and a trouble may occur in the robot operation.

Note that the setting value of $\Delta Pi$ or $P1\_i$ is stored in the storage device of the robot control device 8 as a criterion for determining display or warning. In the robot control device 8, by comparing the calculated value of $\Delta Pi$ or $P1\_i$ with the set value, display and warning are performed by the display on the display board of the robot control device 8, the lighting of the indicator light, the buzzer sound, and the like.

<Variation>

In the above-mentioned example, the gas pressure decrease amount $\Delta Pi$ or the gas pressure $Pi$ is estimated based on only one stop position $i$ (rotation angle $\Theta i$ of the drive shaft 4). While, in order to improve the measurement accuracy, the gas pressure decrease amount $\Delta Pi$ or the gas pressure $Pi$ at a plurality of stop positions may be estimated by the operation including the plurality of different stop positions $i=1, 2, 3 \ldots$, and it may be used as a criterion for determining the gas pressure decrease amount or the gas pressure based on the average value thereof, for example.

Figure 5:
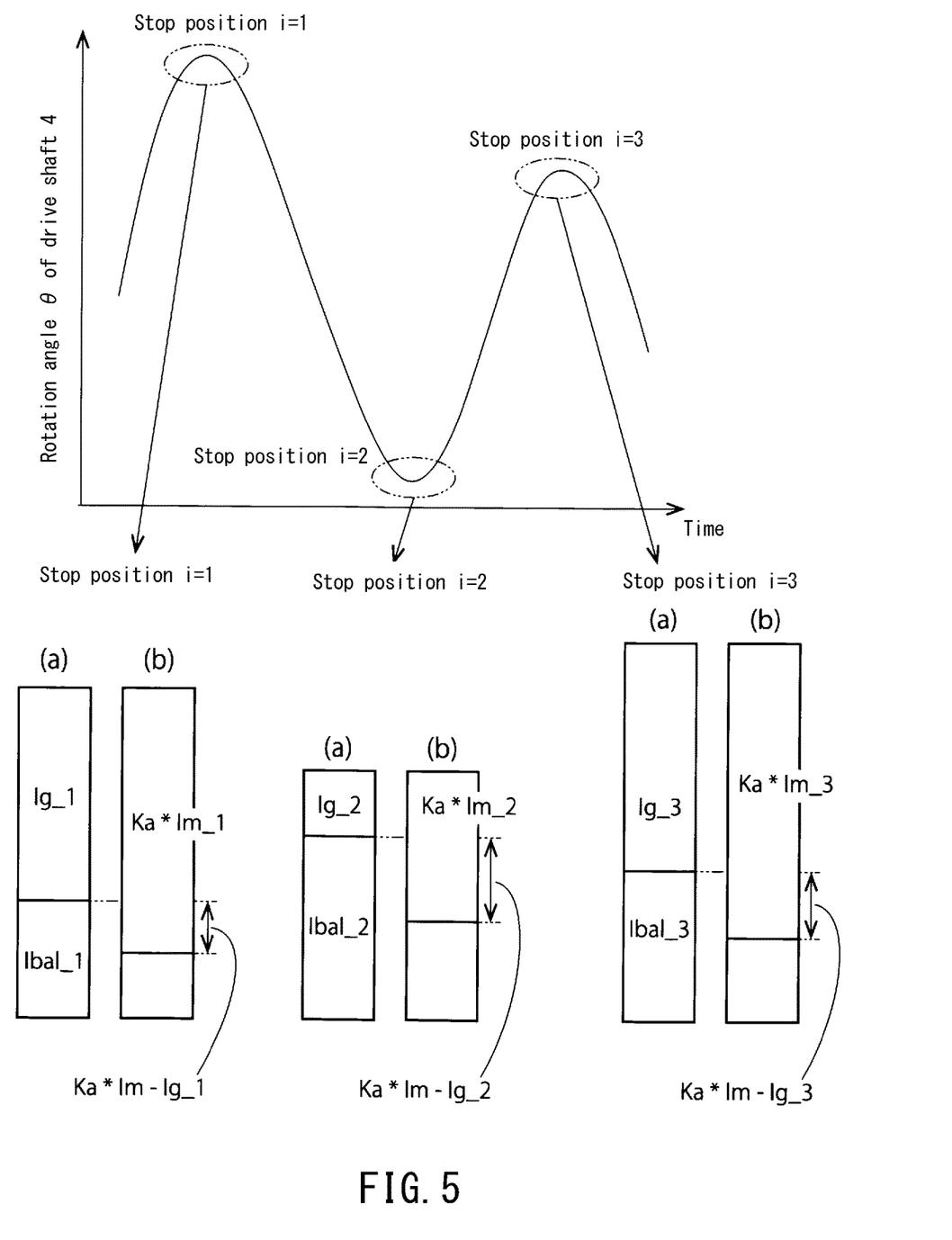
FIG. 5 is a diagram for illustrating a method of estimating a gas decrease state of a gas spring by stopping the robot at three different stop positions while energizing the servo motor.

FIG. 5 is a diagram schematically illustrating the case of performing the robot operation including three stop positions $i=1, 2, 3$ to calculate the gas pressure decrease amount and the like.

FIG. 5(*a*) (setting state) is a diagram illustrating the magnitudes of the motor load current calculation values $Ig\_i$ and $Ibal\_i$ when the motor load torque and the gas spring load torque for generating the theoretical torque necessary to support the weight of the arm are to be generated by the motor current, in a setting state assuming that there is no leakage of the sealed gas in the gas spring 5 at each stop position when the robot 1 is stopped at three different stop positions $i=1, 2, 3$ while energizing the servo motor 9.

FIG. 5(*b*) (Internal pressure declining state) is a diagram illustrating an increase amount of a motor load current calculated assuming that, in a state in which a part of the sealed gas in the gas spring leaks and the output by the gas spring is reduced, the decreased amount of the torque generated by the gas spring is compensated by the torque generated by the servo motor at each stop position when the robot 1 is stopped at three different stop positions $i=1, 2, 3$ while energizing the servo motor 9.

In this example, the servo motor 9 is rotated to operate the link 3 so as to stop at three stop positions $i=1, 2, 3$, and at the stop positions $i=1, 2, 3$, the calculated value $Ig\_i$ of the current of the servo motor in the setting state is calculated by the same method as in the step 2 and step 3, and the measured value $Im\_i$ of the motor current at the stop position $i$ is measured and then the gas pressure decrease amount $\Delta Pi$ or the gas pressure $P1\_i$ of the gas spring 5 is calculated.

After that, for example, the average value of the gas pressure decrease amount $\Delta Pi$ or the gas pressure $P1\_i$ of the gas spring 5 at the three stop positions $i=1, 2, 3$ is calculated, and when the average value of $\Delta Pi$ is larger than the preset decrease amount or when the average value of $P1\_i$ falls below the preset pressure, display and warning are performed as there is a possibility that gas leakage amount of the gas spring is large and a trouble may occur in the robot operation.

Instead of using the average value as a criterion for determining to issue the display or warning, for example, it may be when at least one of the gas pressure decrease amounts $\Delta Pi$ of the gas spring 5 at three stop positions $i=1, 2, 3$ is larger than a preset decrease amount, or when at least one of the gas pressures $P1\_i$ at three stop positions $i=1, 2, 3$ falls below a preset pressure.

The method of estimating the decrease amount of the gas pressure due to the gas leakage of the gas spring 5 in the above embodiment and its variation can be implemented by executing arbitrary arm operations including stop of the arm operation of the robot at an arbitrary time point after starting the use of the robot or gas spring, and therefore it is unnecessary to stop the operation of the robot being used for manufacture of products or the like to perform an independent operation, and the method can be implemented by utilizing the robot operation in use.

Therefore, by estimating the gas pressure decrease amount due to the gas leakage of the gas spring by utilizing a part of the robot operation for manufacturing products, the gas pressure decrease amount can be estimated without stopping the production line and the decline in operation rate can be prevented.

DESCRIPTION OF REFERENCE NUMERALS

1 . . . articulated robot
2 . . . link
3 . . . link
4 . . . drive shaft
5 . . . gas spring
6 . . . cylinder
7 . . . piston rod
8 . . . robot control device
9 . . . servo motor

The invention claimed is:

1. An articulated robot, comprising:
an arm;
a drive motor for driving and positioning the arm;
a gas spring for supporting a load acting on the arm to reduce a load of the drive motor; and
a control unit for controlling the drive motor,
wherein the control unit has a function of estimating a decrease state of a gas sealed inside the gas spring based on an actual current value of the drive motor obtained at a stop position at which the drive motor is operated and stopped in an energized state.

2. The articulated robot according to claim 1, wherein the control unit has a function of calculating a set current value of the drive motor in a setting state assuming that there is no decrease of the gas sealed inside the gas spring based on a rotation angle of the arm at the stop position at which the drive motor is operated and stopped in the energized state, and estimating the decrease state of the gas sealed inside the gas spring based on the set current value and the actual current value.

3. The articulated robot according to claim 2, wherein the set current value is calculated according to a torque-current characteristic based on a load borne by the drive motor in the setting state at the stop position at which the drive motor is operated and stopped in the energized state.

4. The articulated robot according to claim 2, wherein the control unit has a function of estimating the decrease state of the gas sealed inside the gas spring based on a difference between a converted current value obtained by multiplying the actual current value by a correction coefficient for comparing the actual current value with the set current value and the set current value.

5. The articulated robot according to claim 1,
wherein the stop position at which the drive motor is operated and stopped in the energized state includes a plurality of different positions, and
wherein the control unit has a function of estimating the decrease state of the gas sealed inside the gas spring based on the actual current value of the drive motor obtained at the plurality of different positions.

6. A method of estimating a decrease state of a gas sealed inside a gas spring of an articulated robot including a drive motor for driving and positioning an arm; and the gas spring for supporting a load acting on the arm to reduce a load of the drive motor, the method comprising:
a first step of operating the drive motor and stopping the drive motor in an energized state;
a second step of obtaining an actual current value of the drive motor at a stop position in the first step; and
a third step of estimating the decrease state of the gas sealed inside the gas spring based on the actual current value obtained in the second step.

7. The gas decrease state estimation method according to claim 6, wherein the method calculates a set current value of the drive motor in a setting state assuming that there is no decrease of the gas sealed inside the gas spring based on a rotation angle of the arm at the stop position at which the drive motor is operated and stopped in the energized state, and estimates the decrease state of the gas sealed inside the gas spring based on the set current value and the actual current value.

8. The gas decrease state estimation method according to claim 7, wherein the set current value is calculated according to a torque-current characteristic based on a load borne by the drive motor in the setting state at the stop position at which the drive motor is operated and stopped in the energized state.

9. The gas decrease state estimation method according to claim 7, the method estimates the decrease state of the gas sealed inside the gas spring based on a difference between a converted current value obtained by multiplying the actual current value by a correction coefficient for comparing the actual current value with the set current value and the set current value.

10. The gas decrease state estimation method according to claim 6,
wherein the stop position at which the drive motor is operated and stopped in the energized state includes a plurality of different positions, and
wherein the method estimates the decrease state of the gas sealed inside the gas spring based on the actual current value of the drive motor obtained at the plurality of different positions.

* * * * *